United States Patent Office 3,092,832
Patented June 4, 1963

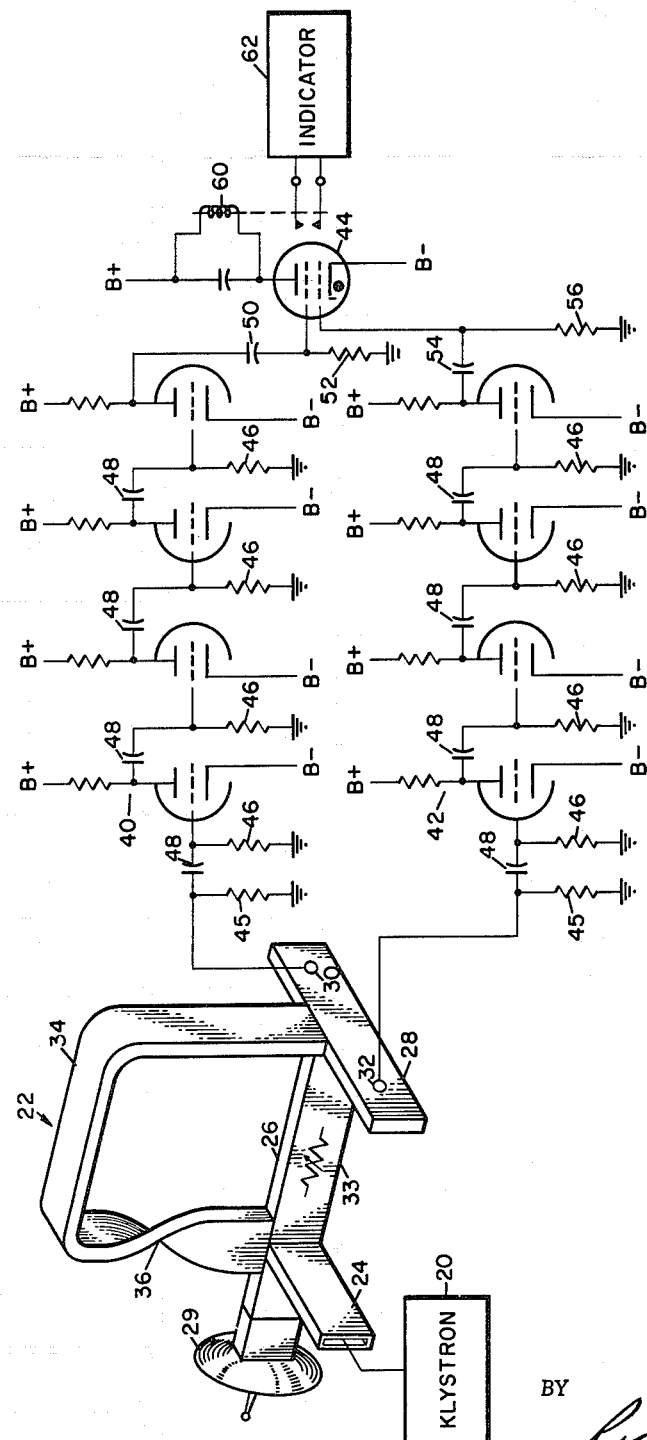

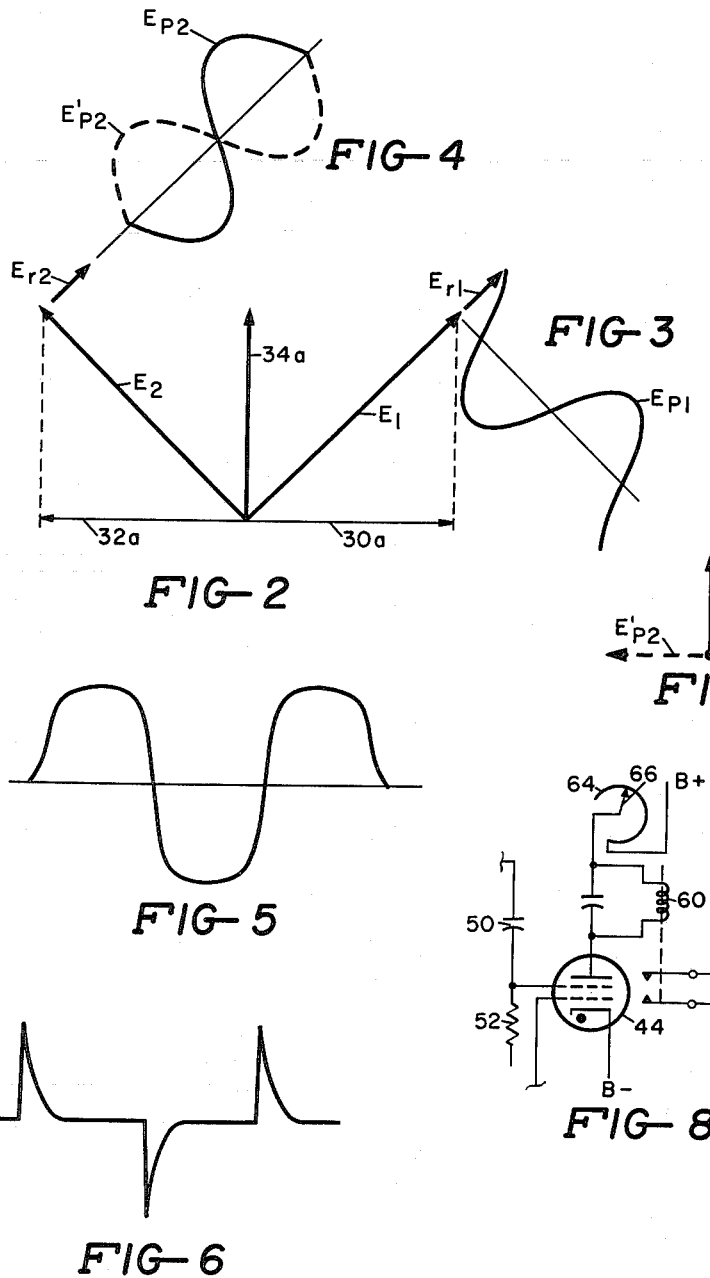

3,092,832
CLOSURE SIGNAL SYSTEM
Julius Schiffman, Huntington Woods, Mich., assignor to
The Bendix Corporation, a corporation of Delaware
Filed Mar. 6, 1959, Ser. No. 797,629
8 Claims. (Cl. 343—8)

This invention pertains to a closure signal system wherein a signal is formed according to the closure rate between two objects.

It is an essential object of this invention to provide a closure signal system between two objects wherein a high frequency radiant energy beam is emitted from one of the objects and reflected by the other of the objects with a frequency of the reflected beam or echo being proportional to any opening or closing rate between the objects and with means for providing a substantially stronger signal upon a closing rate, than upon an opening rate between the objects.

It is another object of this invention to provide in such a system means for mixing or adding divided portions of an emitted beam with the echo to form two out of phase mixed signals which have a first phase relationship for a closing signal and a second phase relationship for an opening signal with additional means for effecting a vectorial sum between mixed closing signals and a vectorial difference between mixed opening signals whereby a much stronger signal is provided for closing movement between the objects than is provided for opening movement between the objects.

It is a further object of this invention to provide a motor vehicle warning or braking system that is automatically operated when two vehicles traveling in the same direction approach one another at an excessive rate wherein a high frequency radiant energy beam is emitted from one of the vehicles and directed at the other of the vehicles with a portion of the emitted beam being divided into first and second portions 180° out of phase, a reflected beam or echo is received and combined with an emitted beam which combination adds vectorially with the first and second portions to form first and second resultant voltages. The second resultant voltage lags the first resultant voltage by an angle of 90° for an opening movement between objects and leads the first voltage by an angle of 90° for a closing movement between the objects, and wherein one of the first and second resultant voltages is differentiated by effectively introducing a 90° phase shift of that voltage so that for a closing movement between vehicles the first and second voltages are in phase with one another and for an opening movement between vehicles the first and second voltages are 180° out of phase with one another whereby an additive signal is provided during closing movement and a subtractive signal is provided during opening movement.

It is a further object of this invention to provide a warning system for closure between objects wherein a high frequency radiant energy beam is emitted from means such as klystron tube, into a branch member of a wave guide hybrid junction such as a magic T having a main arm which is connected intermediately to the branch member and which main arm has connected at one end thereof to a cross member which is a main arm of a second hybrid junction, said cross member carrying a crystal placed near each end thereof, a U-shaped element connecting an intermediate portion of the main arm adjacent the branch member to a central portion of the cross member, with the free end of the main arm being connected to a transmitting and receiving antenna; wherein the klystron transmits a beam to the branch member with a portion of the beam traveling through the main arm to the cross member where the beam is divided 180° in paths towards each crystal and with a portion of the beam traveling to the free end of the main arm and the transmitting antenna, the received signal or echo and a portion of the klystron beam traveling from the free end of the main arm to and through the U-shaped element which is dimensioned to equal an odd multiple of one-quarter of the transmitted wave length so that the waves traveling through the U-shaped element will arrive at the cross member 90° out of phase with the transmitted voltage to combine with the voltages in the arm to form two resultant voltages at a phase angle of 90°. One resultant voltage will be leading the other resultant voltage by 90° for a closing movement between objects and lagging the other by 90° for an opening movement between objects. An amplifying circuit is connected to each of said crystals in the cross member with one of the amplifying circuits having a differentiator or phasing means connected thereto so that the wave form in this circuit is effectively shifted 90° relative to the wave form in the other circuit whereby for a closing movement between objects the resultant signals will be in phase and for an opening movement the resultant signals will be 180° out of phase.

These and other objects will become more apparent when preferred embodiments of my invention are considered along with drawings in which:

FIGURE 1 is a partial perspective schematic diagram of a first embodiment of my invention;

FIGURE 2 is a vector diagram of the wave forms in the cross member or main arm of the second magic T;

FIGURE 3 is a wave form of a rotating vector of one resultant voltage;

FIGURE 4 is a wave form of a rotating vector of a second resultant voltage;

FIGURE 5 is a wave form in an amplifying circuit;

FIGURE 6 is the wave form of FIGURE 5 after differentiating;

FIGURE 7 is a vector diagram of the voltages after differentiating as they appear at the grids of the thyratron; and FIGURE 8 is a second embodiment similar to FIGURE 1 but with absolute vehicle speed information being combined therewith.

Automatic systems have been and are being designed for indicating excessive closure rates between two motor vehicles traveling in the same direction or between a motor vehicle and a stationary object so that a signal is excited to warn of an impending collision and/or braking means are applied to prevent such a collision. In many systems a high frequency radiant energy beam is transmitted from one of the vehicles and directed to the other with any opening or closure rate being determined by the change in frequency of the reflected beam or echo caused by the well known Doppler principle. A serious drawback to these systems is that the automatic warning or braking signal is energized when the vehicles are experiencing a rapid opening movement as well as a closing movement so that a false alarm results.

This invention overcomes this drawback by supplying two mixed signals 90° out of phase and differentiating or pulsing one of said echoes so that an additional 90° phase shift is introduced. One of the two out of phase signals acts as a reference signal while the other will lead the reference signal by 90° for a closing movement between the vehicles and lag the reference signal for an opening movement between the vehicles. The differentiator is placed in one of the signal circuits incorporating a 90° lead therein so that for closing movements it will be in phase with the second signal to provide an additive signal and for opening movements it will be out of phase with the second signal subtracting therefrom. In this manner the warning and/or braking system is energized only during closing vehicle movements.

The unit of this invention may be placed in either or both of the forward or following vehicles: if placement is in the forward of the two vehicles then a warning signal could be flashed to the following vehicle indicating that its rate of approach is excessive; if placed in the second or following vehicle then it could act as a warning to the driver of the second vehicle that his rate of approach is excessive and/or actuate braking means of the second vehicle during such excessive approach rate.

Referring now to the drawings and especially FIGURE 1, a klystron tube 20 is connected to a branch member 24 of a waveguide assembly 22 having two magic T junctions. Member 24 is connected to an intermediate portion of a main arm 26 in a series or E plane connection of a first magic T. One end of member 26 is connected to the central portion of a cross member 28, which is the main arm of a second magic T, in a series or E plane. The other end of member 26 is connected to sending and receiving antenna 29. Member 28 carries at one end crystal 30 and at the other end crystal 32. A section 33 of arm 26 which extends between members 24 and 32 has a portion which is variably damped or attenuated. The length of section 33 is equal to a multiple of the transmitted wave length.

A U-shaped element 34 is connected to member 26 in a shunt or H plane connection of the first magic T and is also connected to a central portion of member 28 in an H plane connection of the second magic T. A 90° turn 36 is formed in element 34 to permit its connection in the previously described manner to arm 26 and member 28. The length of element 34 is equal to an odd multiple of one-quarter wavelength of the transmitted signal from klystron 20.

Klystron 20 emits a low power high frequency signal to branch 24 where the signal is divided between member 28 through the attenuated section 33 of arm 26 and to the free end or antenna end of arm 26. The transmitted signal enters, from the attenuated portion 33, into member 28 where it is split into two signals, 30a and 32a (FIGURE 2), differing in phase by 180°. Also, a portion of the klystron voltage 34a enters element 34 and arrives at member 28 90° out of phase with the signals 30a and 32a due to the difference in length of element 34 and the section 33 of arm 26. The signal 34a combines vectorially with signals 30a and 32a to form, respectively, vectors $E_1$ and $E_2$, which act as coherent local oscillator voltages to crystals 30, 32, respectively.

The transmitted signal going to the antenna end of arm 26 is emitted in a detecting direction, such as longitudinally of the vehicle and in the direction of a second vehicle or object from which it is reflected with the echo being received by the antenna end and entering the free end of arm 26. The echo travels along arm 26 and then into U-element 34 and cross member 28.

The echo is mixed with the transmitted signal vectors $E_1$ and $E_2$ at crystals 30 and 32 and any difference frequency due to opening or closing movement between the two vehicles appears as rotating vectors $E_{r1}$ and $E_{r2}$ at the ends of vectors $E_1$ and $E_2$, respectively. The difference frequency occurs according to the well known Doppler principle. The vectors $E_{r1}$ and $E_{r2}$ rotate in a clockwise direction for a closing movement indicating the changed frequency due to the Doppler principle is higher than the transmitted frequency, and rotate counterclockwise during an opening movement to indicate that the changed frequency is less than the transmitted frequency. It will be appreciated that the projection of rotation in either direction of vector $E_{r1}$ on vector $E_1$ will result in the wave form $E_{p1}$ shown in FIGURE 3 while the projection of rotation of $E_{r2}$ on vector $E_2$ in a clockwise direction will result in the solid wave form $E_{p2}$ in FIGURE 4 and the projection of rotation in a counterclockwise direction will result in the dotted wave form $E'_{p2}$ in FIGURE 4 which differs in phase by 180° from the solid wave form. This difference is important since for a closing movement between vehicles, $E_{p2}$ will lead $E_{p1}$ by 90° and for an opening movement between vehicles $E'_{p2}$ will lag $E_{p1}$ by 90°.

The signals from the transmitter 20 and from the receiving antenna existing in member 28 are superimposed and appear at crystals 30, 32, with the signal at one crystal having a 90° phase difference with the signal at the other crystal and are mixed and passed by the crystals to amplifying circuits 40 and 42, respectively. Here the signals pass through a multiplicity of amplifying stages and then are applied through capacitors to the grids of thyratron 44. Matching resistances 45 are selected to match the hybrid junctions and may be 300 ohms for the particular junctions shown. The resistances 46 and capacitances 48 in the amplifying circuit are chosen to have relatively small values, so that the higher frequencies corresponding to higher closure rates between vehicles are passed more easily whereby the system is more sensitive to higher closure rates. Very satisfactory results have been obtained with resistors 46 being one megohm and capacitances 48 being .002 microfarad. Also, the operating voltage of the amplifying stages are controlled so as to produce a squarelike wave at the amplifier output as shown in FIGURE 5.

The last stage of amplifier 40 is connected to a grid of thyratron 44 through a capacitor 50 with resistance 52 going to ground and amplifying circuit 42 is connected to a grid of thyratron 44 through a capacitor 54 and a resistance 56 going to ground. The values of the capacitance 54 and resistance 56 are substantially less than capacitanace 50 and resistance 52 so that the signal passing therethrough is differentiated or pulsed (FIGURE 6) introducing a further shift of 90° to the signal from amplifying circuit 42. Very satisfactory results have been obtained with capacitor 50 being .01 microfarad and resistor 52 being one megohm, and capacitor 54 being 100 micromicrofarads and resistance 56 being 300,000 ohms. Of course, phase shifting means other than the differentiating circuit may be used.

For a closing movement between vehicles the signals will be in phase so that thyratron 44 can fire and for an opening movement between vehicles the reflected signals will be 180° out of phase so that thyratron 44 cannot fire. The phase relationship before and after differentiating is shown by vectors in FIGURE 7 where $E_{p1}$ before differentiating is shown lagging voltage $E_{p2}$ 90° for a closing movement and leading $E'_{p2}$ for an opening movement due to the action previously described. By introducing a 90° leading phase shift to $E_{p1}$ to the position $E'_{p1}$, it is in phase with voltage $E_{p2}$ and 180° out of phase from voltage $E'_{p2}$.

The plate circuit of thyratron 44 is connected to a coil 60 which, when energized, actuates an indicator 62 for controlling warning and/or braking or other circuits in the vehicle.

A brief description of the operation of this embodiment is as follows: Klystron 20 emits a high frequency signal to the branch 24 of coupler 22. A portion of this signal is transmitted to cross member 28 where it is divided into two signals differing in phase by 180°. Another portion of the klystron signal passes to the antenna where it is transmitted in the direction of a second vehicle or object. A portion 34a of the klystron signal enters element 34 and enters member 28 90° out of phase with signals 30a and 32a. The reflection or echo from the second vehicle is received by the antenna and travels through arm 26 to U-element 34. Signal 34a combines with signals 30a and 32a to form two 90° out of phase resultant signals $E_1$ and $E_2$ which are mixed at the crystals with the echo and have at their ends rotating vectors $E_{r1}$ and $E_{r2}$, representing the difference frequencies due to opening and closing movements. The projection of $E_{r1}$ on $E_1$ is the same for opening and closing movements but the projection of $E_{r2}$ on $E_2$ varies by 180° for opening and closing movements so that for a closing movement $E_{r2}$ leads $E_{r1}$ by 90° and for an opening movement $E_{r2}$ lags $E_{r1}$ by 90°.

The two projected signals, $E_{p1}$ and $E_{p2}$, are fed to amplifying circuits 40, 42, which are more sensitive to high frequency signals, and each of the signals is amplified and formed into a squarelike voltage form shown in FIGURE 5. The signal $E_{p1}$ is then differentiated by a relatively small capacitance 54 and resistance 56 to give voltage $E'_{p1}$ which leads $E_{p1}$ by 90°. As shown in FIGURE 7, voltage $E'_{p1}$ is in phase with voltage $E_{p2}$ and 180° out of phase with $E'_{p2}$. This will cause thyratron 44 to fire for a closing movement to energize indicator 62 and will not fire thyratron 44 for an opening movement.

If desired, a speedometer actuated rheostat 64 may be added to the plate circuit of thyratron 44 as shown in partial schematic of FIGURE 8. As the speed of the vehicle increases, the rheostat pointer 66 will move clockwise and less resistance will be in the circuit of coil 60 so that a signal is provided to indicator 62 at an earlier time. This is advantageous since at higher speeds longer warning times are desired.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A signal system operative during relative movement between objects comprising means for emitting high frequency radiant energy beams, means for receiving the echoes of said beams, means for dividing a beam echo into components having a first phase difference upon relative opening movement between said objects, means for providing a second phase difference between echo components upon relative closing movement between said objects, means for emitting signals of different strengths when subject to echo components related by said second phase difference than when subject to echo components related by said first phase difference whereby relative opening and closing movements are distinguished.

2. A closure signal system wherein a signal is formed according to the closure rate between objects comprising means for emitting high frequency radiant energy beams, means for receiving the echoes of said beams, means for dividing a beam echo into components having a first phase difference upon relative opening movement between said objects, means for providing a second phase difference between echo components upon relative closing movement between said objects, means for emitting a stronger signal when subject to echo components related by said second phase differences than when subject to echo components related by said first phase difference.

3. A closure signal system for a motor vehicle wherein a signal is formed according to the closure rate between the vehicle and an object in the vehicle path comprising means for emitting high frequency radiant energy beams, means for receiving the echoes of said beams, means for providing beam echo portions having an adding phase sum therebetween upon relative closing movement between said objects and having a subtracting phase difference therebetween upon relative opening movement between said objects, means for emitting a stronger signal when subject to said adding phase sum than when subject to said subtracting phase difference.

4. A closure signal system wherein a signal is formed according to the relative movement between objects comprising means for emitting a high frequency radiant energy beam, means for receiving the echo of said beam, means for dividing said echo into a plurality of out of phase portions, means for providing an adding phase sum between said portions upon one of a closing and opening movement between said objects and a subtracting phase difference between said portions upon the other of a closing and opening movement between said objects, means for emitting a relatively strong signal when subject to said adding phase sum and emitting a relatively weak signal when subject to said subtracting phase difference.

5. A closure signal system wherein a signal is formed in proportion to the closure rate between objects comprising means for emitting a high frequency radiant energy beam, means for receiving the echo of said beam, a waveguide directional coupler having a main arm and a cross member attached to one end thereof, crystal means being formed near each end of said cross member, an input branch being connected to one side of said main arm and extending transversely therefrom spaced from and in a direction parallel to said cross member, a U-shaped element connected to said main arm at the junctions of said branch and cross member with said main arm and extending in direction normal to the plane of said main arm and cross member, said emitting means being connected to said input branch and said receiving means being connected to the free end of said main arm, each of said crystal means being connected to an amplifying circuit, one of said amplifying circuits being connected to a differentiating circuit, the other amplifier and said differentiating circuit being connected to separate grids of a thyratron, said thyratron being in a signal circuit, said differentiating circuit effectively shifting the phase for the signal in said one amplifying circuit whereby signals for closing movements will be substantially in phase and signals for opening movements will be substantially out of phase.

6. A closure signal system wherein a signal is formed in proportion to the closure rate between objects comprising means for emitting a high frequency radiant energy beam, means for receiving the echo of said beam, a waveguide directional coupler having a main arm and a cross member attached to one end thereof, crystal means being formed near each end of said cross member, an input branch being connected to one side of said main arm and extending transversely therefrom spaced from and in a direction parallel to said cross member, a U-shaped element connected to said main arm at the junctions of said branch and cross member with said main arm and extending in a direction normal to the plane of said main arm and cross member, said emitting means being connected to said input branch and said receiving means being connected to the free end of said main arm, one of said crystal means being connected to a differentiating circuit so that signals for a closing movement between objects will be in phase and signals for an opening movement will be out of phase.

7. A closure signal system for a motor vehicle wherein a signal is formed in proportion to the closure rate between the motor vehicle and an object in the path of said vehicle comprising means for emitting high frequency radiant energy beams, means for receiving the echoes of said beams, means for dividing a beam into components having a first phase difference therebetween upon relative opening movement between said objects and having a second phase difference therebetween upon relative closing movement between said objects, means for differentiating one of said components so that said first phase difference is subtractive and said second phase difference is additive, means for emitting a signal when subjected to said additive phase difference, means in the signal circuit for increasing said signal as the absolute speed of said vehicle is increased.

8. A closure signal system for a motor vehicle wherein a signal is formed in proportion to the closure rate between the motor vehicle and an object in the path of said vehicle comprising means for emitting a high frequency radiant energy beam, means for receiving the echoes of said beam, means for dividing a beam into components having a first phase difference therebetween upon relative opening movement between said objects and having a second phase difference therebetween upon relative closing movement between said objects, means for differentiating one of said components so that said first difference is subtractive and said second phase difference is additive, signal means for emitting a signal when subjected to said additive phase difference being connected to said differentiating means, rheostat means adapted to be operated by the vehicle speedometer so that the resistance of said rheostat means is varied according to the speedometer position, said rheostat means being connected to said signal means to decrease the signal level required to energize said signal means so that at higher speedometer settings a correspondingly lower signal level is required to energize said signal means.

References Cited in the file of this patent
UNITED STATES PATENTS

| | | |
|---|---|---|
| 2,540,076 | Dicke | Feb. 6, 1951 |
| 2,949,603 | Logue | Aug. 16, 1960 |
| 3,003,147 | Lueg | Oct. 3, 1961 |